(12) United States Patent
Cassia et al.

(10) Patent No.: US 12,099,833 B2
(45) Date of Patent: Sep. 24, 2024

(54) METHOD AND SYSTEM FOR CODEBASE MODELING

(71) Applicant: JPMorgan Chase Bank, N.A., New York, NY (US)

(72) Inventors: Matteo Cassia, London (GB); Wojciech Kokot, London (GB); James Burrow, Shoreham-by-Sea (GB)

(73) Assignee: JPMorgan Chase Bank, N.A., New York, NY (US)

( * ) Notice: Subject to any disclaimer, the term of this patent is extended or adjusted under 35 U.S.C. 154(b) by 148 days.

(21) Appl. No.: 17/647,203

(22) Filed: Jan. 6, 2022

(65) Prior Publication Data

US 2023/0214211 A1 Jul. 6, 2023

(51) Int. Cl.
*G06F 8/70* (2018.01)

(52) U.S. Cl.
CPC .................................. *G06F 8/70* (2013.01)

(58) Field of Classification Search
None
See application file for complete search history.

(56) References Cited

U.S. PATENT DOCUMENTS

| 10,114,624 | B1 * | 10/2018 | Makkar | G06F 8/48 |
| 2008/0229278 | A1 * | 9/2008 | Liu | G06F 8/36 |
| | | | | 717/106 |
| 2012/0266136 | A1 * | 10/2012 | Brown | G06F 11/3672 |
| | | | | 717/124 |
| 2016/0335555 | A1 * | 11/2016 | Llanes-Tosar | G06F 11/0706 |
| 2017/0075790 | A1 * | 3/2017 | Macleod | G06F 11/3664 |
| 2020/0226053 | A1 * | 7/2020 | Meibusch | G06F 11/3086 |
| 2022/0179731 | A1 * | 6/2022 | Jung | G06F 11/0793 |
| 2022/0318129 | A1 * | 10/2022 | Yosef | G06F 11/3676 |

* cited by examiner

*Primary Examiner* — Lewis A Bullock, Jr.
*Assistant Examiner* — Mark A Gooray
(74) *Attorney, Agent, or Firm* — GREENBLUM & BERNSTEIN, P.L.C.

(57) ABSTRACT

A method for automatically modeling a codebase to facilitate management and analytics is provided. The method includes automatically aggregating a data set, the data set including data that correspond to a codebase; identifying, from the data set, entities and corresponding attributes, the entities relating to a component of the codebase; establishing, by using the data set, a relationship for the entities, the relationship corresponding to an interaction between each of the entities; determining a potential owner for each of the entities based on a corresponding change history; defining, by using the data set, an ownership rule for each of the entities, the ownership rule associating the potential owner to the corresponding entities; and computing an actionable item for each of the entities based on the corresponding attributes.

20 Claims, 8 Drawing Sheets

METHOD AND SYSTEM FOR CODEBASE MODELING

BACKGROUND

1. Field of the Disclosure

This technology generally relates to methods and systems for codebase management, and more particularly to methods and systems for automatically modeling a codebase to facilitate management and analytics of the codebase at scale.

2. Background Information

Many business entities operate extensive software systems to provide services for users. Often, to facilitate development of software components for the software systems, large codebases of source codes are required. Historically, implementations of conventional codebase management methodologies have resulted in varying degrees of success with respect to effective and efficient management of widespread changes that are made to the codebase.

One drawback of using conventional codebase management methodologies is that in many instances, the number of software components and responsible development teams rises as the codebase size increases. As a result, high-level insight for an entirety of the codebase and/or a subset of the codebase becomes more difficult to obtain in large codebases. Additionally, for repetitive changes such as, for example, upgrades to a newer version of a programming language, repeated overhead may result because of duplicated efforts.

Therefore, there is a need for an automated system that effectively and efficiently model all features of a codebase to facilitate management and analytics of the codebase at scale.

SUMMARY

The present disclosure, through one or more of its various aspects, embodiments, and/or specific features or sub-components, provides, inter alia, various systems, servers, devices, methods, media, programs, and platforms for automatically modeling a codebase to facilitate management and analytics of the codebase at scale.

According to an aspect of the present disclosure, a method for automatically modeling a codebase to facilitate management and analytics is disclosed. The method is implemented by at least one processor. The method may include automatically aggregating at least one data set, the at least one data set may include data that correspond to a codebase; identifying, from the at least one data set, at least one entity and at least one corresponding attribute, the at least one entity may relate to a component of the codebase; establishing, by using the at least one data set, at least one relationship for each of the at least one entity, the at least one relationship may correspond to an interaction between each of the at least one entity; determining at least one potential owner for each of the at least one entity based on a corresponding change history; defining, by using the at least one data set, at least one ownership rule for each of the at least one entity, the at least one ownership rule may associate the at least one potential owner to the corresponding at least one entity; and computing at least one actionable item for each of the at least one entity based on the at least one corresponding attribute.

In accordance with an exemplary embodiment, the method may further include compiling, for each of the at least one potential owner, corresponding information that includes at least one from among actionable item information, entity information, entity metrics information, and entity statistics information; and exposing, via an application programming interface, the compiled corresponding information for each of the at least one potential owner.

In accordance with an exemplary embodiment, to compute the at least one actionable item, the method may further include identifying at least one predetermined guideline for each of the at least one entity; and computing, by using at least one predictive model, the at least one actionable item for each of the at least one entity based on the at least one corresponding attribute, the at least one corresponding relationship, and the at least one corresponding predetermined guideline.

In accordance with an exemplary embodiment, the at least one predetermined guideline may include at least one from among an application execution criterion, a test coverage threshold percentage, and a test failure rate.

In accordance with an exemplary embodiment, the at least one predictive model may include at least one from among a machine learning model, a statistical model, a mathematical model, a process model, and a data model.

In accordance with an exemplary embodiment, the method may further include determining, by using the at least one predictive model, a priority designation for each of the at least one actionable item; and automatically assigning the at least one actionable item to the at least one potential owner based on the corresponding priority designation and the corresponding at least one ownership rule.

In accordance with an exemplary embodiment, the method may further include determining, by using the at least one predictive model, at least one corrective action for each of the at least one actionable item; and automatically initiating the at least one corrective action based on a predetermined user preference and the corresponding priority designation to resolve the at least one actionable item.

In accordance with an exemplary embodiment, the at least one data set may be aggregated based on a predetermined schedule.

In accordance with an exemplary embodiment, the at least one entity may include at least one from among a script, a test, and an application; and wherein the corresponding at least one attribute may include information that relates to at least one from among a programming language version, a platform type, an application type, a number of code lines, an amount of test coverage, an update history, and a result of previous execution.

According to an aspect of the present disclosure, a computing device configured to implement an execution of a method for automatically modeling a codebase to facilitate management and analytics is disclosed. The computing device including a processor; a memory; and a communication interface coupled to each of the processor and the memory, wherein the processor may be configured to automatically aggregate at least one data set, the at least one data set may include data that correspond to a codebase; identify, from the at least one data set, at least one entity and at least one corresponding attribute, the at least one entity may relate to a component of the codebase; establish, by using the at least one data set, at least one relationship for each of the at least one entity, the at least one relationship may correspond to an interaction between each of the at least one entity; determine at least one potential owner for each of the at least one entity based on a corresponding change history; define, by using the at least one data set, at least one ownership rule for each of the at least one entity, the at least one ownership rule may associate the at least one potential owner to the corresponding at least one entity; and compute at least one actionable item for each of the at least one entity based on the at least one corresponding attribute.

In accordance with an exemplary embodiment, the processor may be further configured to compile, for each of the at least one potential owner, corresponding information that includes at least one from among actionable item information, entity information, entity metrics information, and entity statistics information; and expose, via an application programming interface, the compiled corresponding information for each of the at least one potential owner.

In accordance with an exemplary embodiment, to compute the at least one actionable item, the processor may be further configured to identify at least one predetermined guideline for each of the at least one entity; and compute, by using at least one predictive model, the at least one actionable item for each of the at least one entity based on the at least one corresponding attribute, the at least one corresponding relationship, and the at least one corresponding predetermined guideline.

In accordance with an exemplary embodiment, the at least one predetermined guideline may include at least one from among an application execution criterion, a test coverage threshold percentage, and a test failure rate.

In accordance with an exemplary embodiment, the at least one predictive model may include at least one from among a machine learning model, a statistical model, a mathematical model, a process model, and a data model.

In accordance with an exemplary embodiment, the processor may be further configured to determine, by using the at least one predictive model, a priority designation for each of the at least one actionable item; and automatically assign the at least one actionable item to the at least one potential owner based on the corresponding priority designation and the corresponding at least one ownership rule.

In accordance with an exemplary embodiment, the processor may be further configured to determine, by using the at least one predictive model, at least one corrective action for each of the at least one actionable item; and automatically initiate the at least one corrective action based on a predetermined user preference and the corresponding priority designation to resolve the at least one actionable item.

In accordance with an exemplary embodiment, the processor may be further configured to aggregate the at least one data set based on a predetermined schedule.

In accordance with an exemplary embodiment, the at least one entity may include at least one from among a script, a test, and an application; and wherein the corresponding at least one attribute may include information that relates to at least one from among a programming language version, a platform type, an application type, a number of code lines, an amount of test coverage, an update history, and a result of previous execution.

According to an aspect of the present disclosure, a non-transitory computer readable storage medium storing instructions for automatically modeling a codebase to facilitate management and analytics is disclosed. The storage medium including executable code which, when executed by a processor, may cause the processor to automatically aggregate at least one data set, the at least one data set may include data that correspond to a codebase; identify, from the at least one data set, at least one entity and at least one corresponding attribute, the at least one entity may relate to a component of the codebase; establish, by using the at least one data set, at least one relationship for each of the at least one entity, the at least one relationship may correspond to an interaction between each of the at least one entity; determine at least one potential owner for each of the at least one entity based on a corresponding change history; define, by using the at least one data set, at least one ownership rule for each of the at least one entity, the at least one ownership rule may associate the at least one potential owner to the corresponding at least one entity; and compute at least one actionable item for each of the at least one entity based on the at least one corresponding attribute.

In accordance with an exemplary embodiment, the executable code may further cause the processor to compile, for each of the at least one potential owner, corresponding information that includes at least one from among actionable item information, entity information, entity metrics information, and entity statistics information; and expose, via an application programming interface, the compiled corresponding information for each of the at least one potential owner.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

DETAILED DESCRIPTION

Through one or more of its various aspects, embodiments and/or specific features or sub-components of the present disclosure, are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

Figure 1:
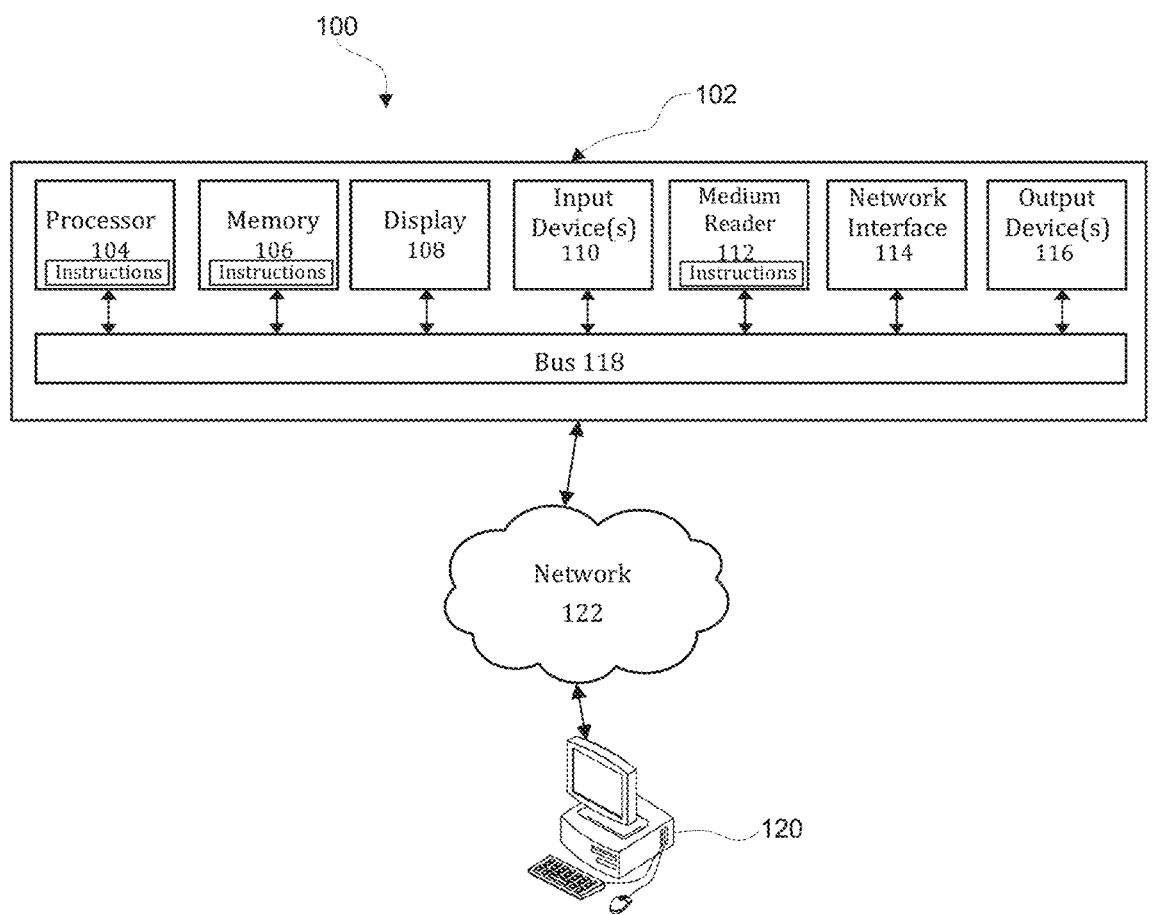
FIG. 1 illustrates an exemplary computer system.

FIG. 1 is an exemplary system for use in accordance with the embodiments described herein. The system 100 is generally shown and may include a computer system 102, which is generally indicated.

The computer system 102 may include a set of instructions that can be executed to cause the computer system 102 to perform any one or more of the methods or computer-based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term "system" shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general-purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data and executable instructions, and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, blu-ray disk, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid-state display, a cathode ray tube (CRT), a plasma display, or any other type of display, examples of which are well known to skilled persons.

The computer system 102 may also include at least one input device 110, such as a keyboard, a touch-sensitive input screen or pad, a speech input, a mouse, a remote-control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g., software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software, or any combination thereof which are commonly known and understood as being included with or within a computer system, such as, but not limited to, a network interface 114 and an output device 116. The output device 116 may be, but is not limited to, a speaker, an audio out, a video out, a remote-control output, a printer, or any combination thereof.

Each of the components of the computer system 102 may be interconnected and communicate via a bus 118 or other communication link. As shown in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is shown in FIG. 1 as a wireless network, those skilled in the art appreciate that the network 122 may also be a wired network.

The additional computer device 120 is shown in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and parallel processing. Virtual computer system processing can be constructed to implement one or more of the methods or functionalities as described herein, and a processor described herein may be used to support a virtual processing environment.

As described herein, various embodiments provide optimized methods and systems for automatically modeling a codebase to facilitate management and analytics of the codebase at scale.

Figure 2:
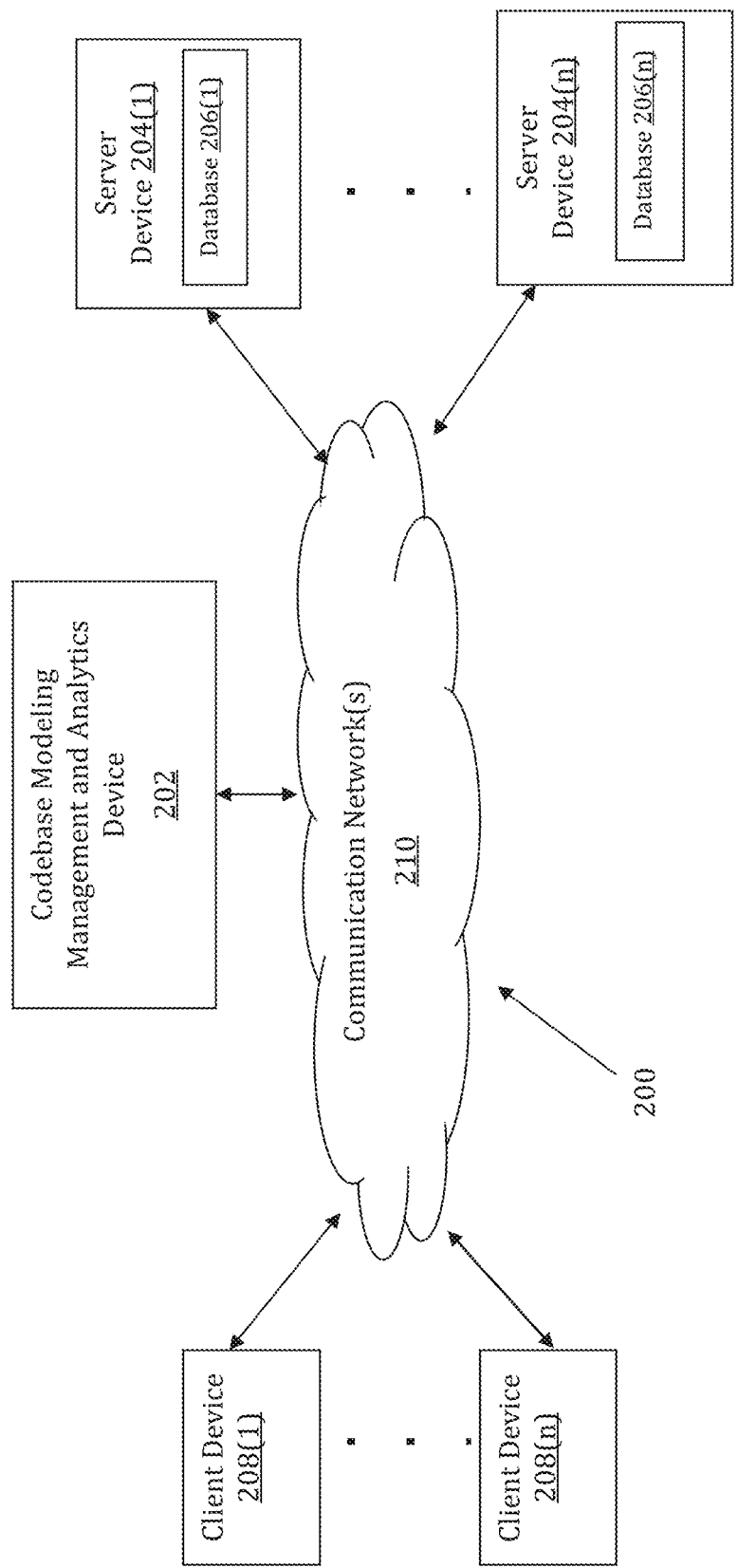
FIG. 2 illustrates an exemplary diagram of a network environment.

Referring to FIG. 2, a schematic of an exemplary network environment 200 for implementing a method for automatically modeling a codebase to facilitate management and analytics of the codebase at scale is illustrated. In an exemplary embodiment, the method is executable on any networked computer platform, such as, for example, a personal computer (PC).

The method for automatically modeling a codebase to facilitate management and analytics of the codebase at scale may be implemented by a Codebase Modeling Management and Analytics (CMMA) device 202. The CMMA device 202 may be the same or similar to the computer system 102 as described with respect to FIG. 1. The CMMA device 202 may store one or more applications that can include executable instructions that, when executed by the CMMA device 202, cause the CMMA device 202 to perform actions, such as to transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the CMMA device 202 itself, may be located in virtual server(s) running in a cloud-based computing environment rather than being tied to one or more specific physical network computing devices. Also, the application(s) may be running in one or more virtual machines (VMs) executing on the CMMA device 202. Additionally, in one or more embodiments of this technology, virtual machine(s) running on the CMMA device 202 may be managed or supervised by a hypervisor.

In the network environment 200 of FIG. 2, the CMMA device 202 is coupled to a plurality of server devices 204(1)-204(n) that hosts a plurality of databases 206(1)-206(n), and also to a plurality of client devices 208(1)-208(n) via communication network(s) 210. A communication interface of the CMMA device 202, such as the network interface 114 of the computer system 102 of FIG. 1, operatively couples and communicates between the CMMA device 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the CMMA device 202, the server devices 204(1)-204(n), and/or the client devices 208(1)-208(n) may be coupled together via other topologies. Additionally, the network environment 200 may include other network devices such as one or more routers and/or switches, for example, which are well known in the art and thus will not be described herein. This technology provides a number of advantages including methods, non-transitory computer readable media, and CMMA devices that efficiently implement a method for automatically modeling a codebase to facilitate management and analytics of the codebase at scale.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 210 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The CMMA device 202 may be a standalone device or integrated with one or more other devices or apparatuses, such as one or more of the server devices 204(1)-204(n), for example. In one particular example, the CMMA device 202 may include or be hosted by one of the server devices 204(1)-204(n), and other arrangements are also possible. Moreover, one or more of the devices of the CMMA device 202 may be in a same or a different communication network including one or more public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204(n) may include, among other features, one or more processors, a memory, and a communication interface, which are coupled together by a bus or other communication link, although other numbers and/or types of network devices may be used. The server devices 204(1)-204(n) in this example may process requests received from the CMMA device 202 via the communication network(s) 210 according to the HTTP-based and/or JavaScript Object Notation (JSON) protocol, for example, although other protocols may also be used.

The server devices 204(1)-204(n) may be hardware or software or may represent a system with multiple servers in a pool, which may include internal or external networks. The server devices 204(1)-204(n) hosts the databases 206(1)-206(n) that are configured to store data that relates to data sets, codebases, entities, relationships, owner information, ownership rules, actionable items, and predictive models.

Although the server devices 204(1)-204(n) are illustrated as single devices, one or more actions of each of the server devices 204(1)-204(n) may be distributed across one or more distinct network computing devices that together comprise one or more of the server devices 204(1)-204(n). Moreover, the server devices 204(1)-204(n) are not limited to a particular configuration. Thus, the server devices 204(1)-204(n) may contain a plurality of network computing devices that operate using a controller/agent approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. For example, the client devices 208(1)-208(n) in this example may include any type of computing device that can interact with the CMMA device 202 via communication network(s) 210. Accordingly, the client devices 208(1)-208(n) may be mobile computing devices, desktop computing devices, laptop computing devices, tablet computing devices, virtual machines (including cloud-based computers), or the like, that host chat, e-mail, or voice-to-text applications, for example. In an exemplary embodiment, at least one client device 208 is a wireless mobile communication device, i.e., a smart phone.

The client devices 208(1)-208(n) may run interface applications, such as standard web browsers or standalone client applications, which may provide an interface to communicate with the CMMA device 202 via the communication network(s) 210 in order to communicate user requests and information. The client devices 208(1)-208(n) may further include, among other features, a display device, such as a display screen or touchscreen, and/or an input device, such as a keyboard, for example.

Although the exemplary network environment 200 with the CMMA device 202, the server devices 204(1)-204(n), the client devices 208(1)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the CMMA device 202, the server devices 204(1)-204(n), or the client devices 208(1)-208(n), for example, may be configured to operate as virtual instances on the same physical machine. In other words, one or more of the CMMA device 202, the server devices 204(1)-204(n), or the client devices 208(1)-208(n) may operate on the same physical device rather than as separate devices communicating through communication network(s) 210. Additionally, there may be more or fewer CMMA devices 202, server devices 204(1)-204(n), or client devices 208(1)-208(n) than illustrated in FIG. 2.

In addition, two or more computing systems or devices may be substituted for any one of the systems or devices in any example. Accordingly, principles and advantages of distributed processing, such as redundancy and replication, also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
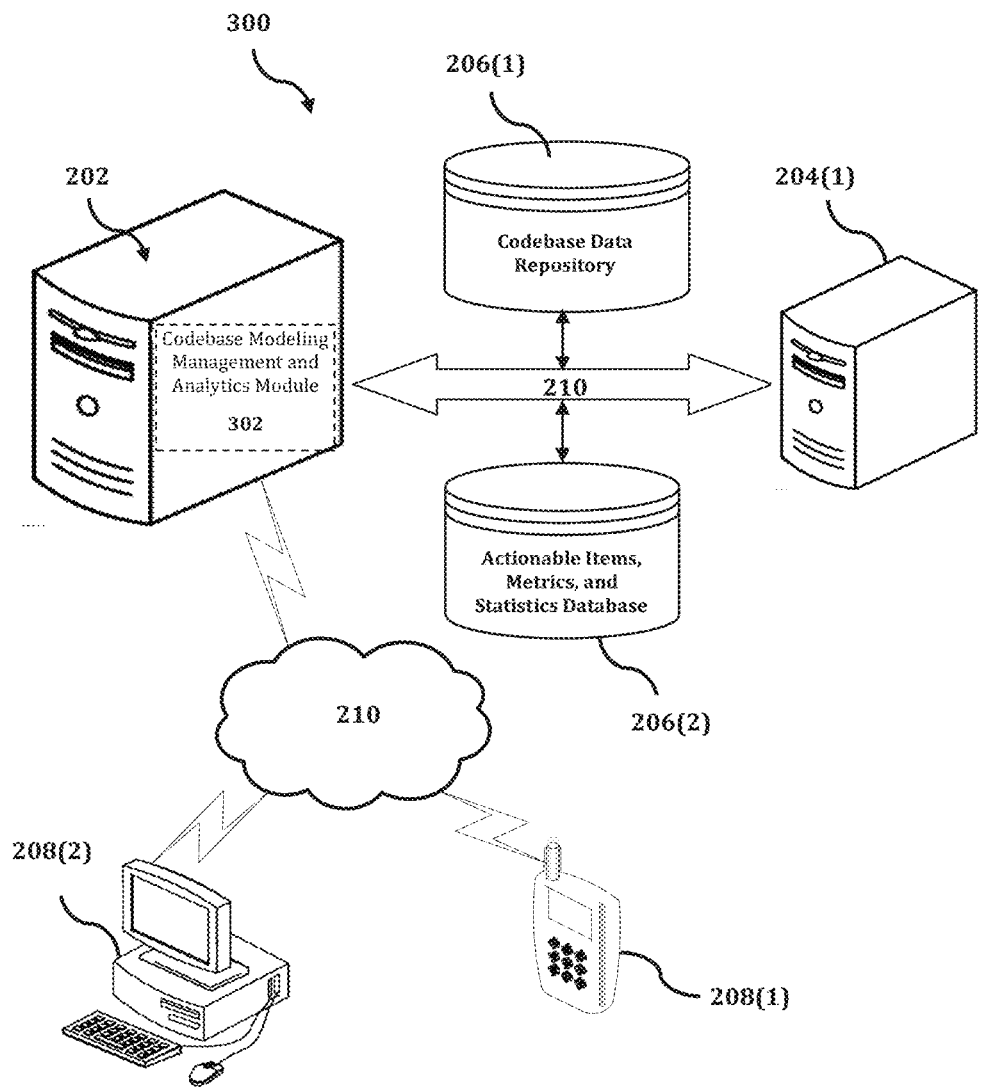
FIG. 3 shows an exemplary system for implementing a method for automatically modeling a codebase to facilitate management and analytics of the codebase at scale.

The CMMA device 202 is described and shown in FIG. 3 as including a codebase modeling management and analytics module 302, although it may include other rules, policies, modules, databases, or applications, for example. As will be described below, the codebase modeling management and analytics module 302 is configured to implement a method for automatically modeling a codebase to facilitate management and analytics of the codebase at scale.

An exemplary process 300 for implementing a mechanism for automatically modeling a codebase to facilitate management and analytics of the codebase at scale by utilizing the network environment of FIG. 2 is shown as being executed in FIG. 3. Specifically, a first client device 208(1) and a second client device 208(2) are illustrated as being in communication with CMMA device 202. In this regard, the first client device 208(1) and the second client device 208(2) may be "clients" of the CMMA device 202 and are described herein as such. Nevertheless, it is to be known and understood that the first client device 208(1) and/or the second client device 208(2) need not necessarily be "clients" of the CMMA device 202, or any entity described in association therewith herein. Any additional or alternative relationship may exist between either or both of the first client device 208(1) and the second client device 208(2) and the CMMA device 202, or no relationship may exist.

Further, CMMA device 202 is illustrated as being able to access a codebase data repository 206(1) and an actionable items, metrics, and statistics database 206(2). The codebase modeling management and analytics module 302 may be configured to access these databases for implementing a method for automatically modeling a codebase to facilitate management and analytics of the codebase at scale.

The first client device 208(1) may be, for example, a smart phone. Of course, the first client device 208(1) may be any additional device described herein. The second client device 208(2) may be, for example, a personal computer (PC). Of course, the second client device 208(2) may also be any additional device described herein.

The process may be executed via the communication network(s) 210, which may comprise plural networks as described above. For example, in an exemplary embodiment, either or both of the first client device 208(1) and the second client device 208(2) may communicate with the CMMA device 202 via broadband or cellular communication. Of course, these embodiments are merely exemplary and are not limiting or exhaustive.

Upon being started, the codebase modeling management and analytics module 302 executes a process for automatically modeling a codebase to facilitate management and analytics of the codebase at scale. An exemplary process for automatically modeling a codebase to facilitate management and analytics of the codebase at scale is generally indicated at flowchart 400 in FIG. 4.

Figure 4:
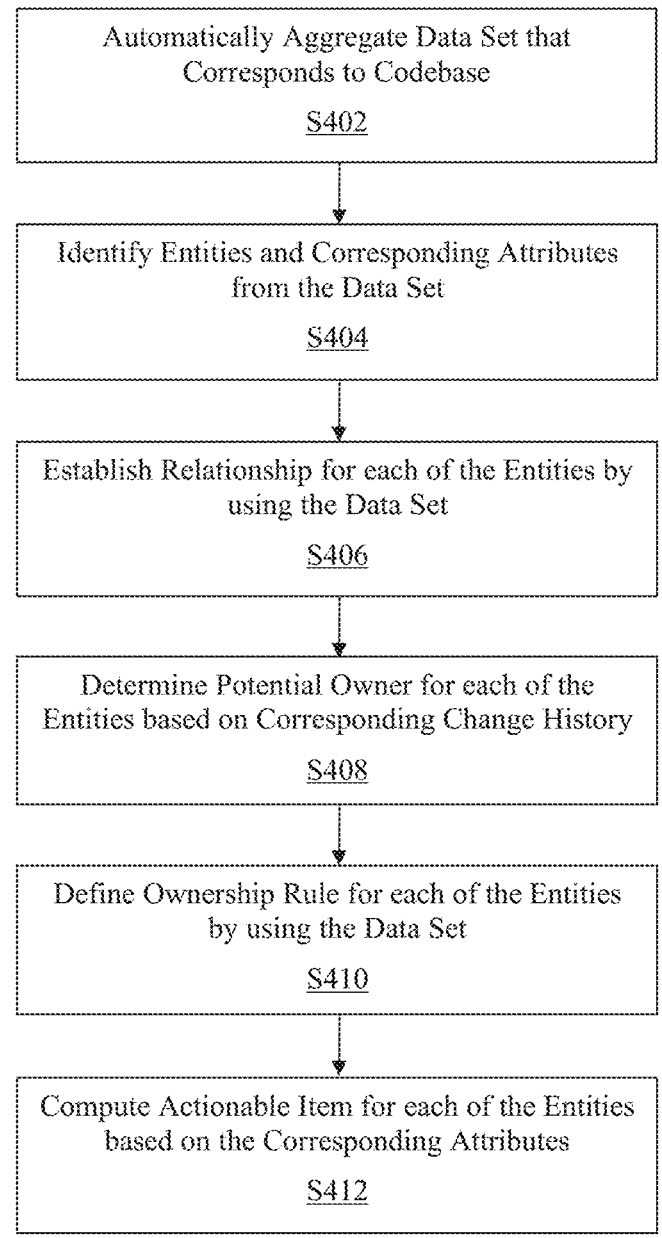
FIG. 4 is a flowchart of an exemplary process for implementing a method for automatically modeling a codebase to facilitate management and analytics of the codebase at scale.

In the process 400 of FIG. 4, at step S402, a data set may be automatically aggregated. The data set may include data such as, for example, source code data that correspond to a codebase. In an exemplary embodiment, the data set may include a collection of data in a data format that corresponds to the codebase. For example, the data set may include a data type such as tabular data that corresponds to a database that persists the codebase. In another exemplary embodiment, the data set may include a structured representation of raw codebase data. The raw codebase data may be structured based on a predetermined mapping to convert the raw data to a structured data set.

In another exemplary embodiment, the data set may be automatically aggregated based on a predetermined schedule. The predetermined schedule may relate to a timetable such as, for example, a once-a-day timetable that is based on a user setting and/or a business guideline. In another exemplary embodiment, the data set may be aggregated ad hoc based on a user preference. For example, a user may interact with a corresponding graphical user interface to initiate aggregation of the data set.

In another exemplary embodiment, the codebase may correspond to a collection of source codes that is used to build a software system, an application, and/or a software component. The codebase may include human-written source code files as well as machine-written source code files. In another exemplary embodiment, the codebase may include at least one from among object files, configuration files, and property files. The codebase may be persisted as distinct codebases as well as a monolithic codebase.

At step S404, entities and corresponding attributes may be identified from the data set. The entities may relate to components of the codebase. In an exemplary embodiment, the entities may include at least one from among a script, a test, and an application. The script may relate to a set of commands that are executed by an operating system or application. The test may relate to a set of instructions such as, for example, a test script that will be performed on the system to test system functions.

In another exemplary embodiment, the application may include at least one from among a web application, a monolithic application, and a microservice application. The monolithic application may describe a single-tiered software application where the user interface and data access code are combined into a single program from a single platform. The monolithic application may be self-contained and independent from other computing applications.

In another exemplary embodiment, the web application may correspond to application software that runs on a web server. Unlike computer-based software programs that run locally on the operating system of a device, the web application may be accessed by the user through a web browser with an active network connection. The web application may be programmed by using a client-server modeled structure wherein the user is provided services via an off-site server. The off-site server may include first-party off-site servers as well as third-party off-site servers.

In another exemplary embodiment, a microservice application may include a unique service and a unique process that communicates with other services and processes over a network to fulfill a goal. The microservice application may be independently deployable and organized around business capabilities. In another exemplary embodiment, the microservices may relate to a software development architecture such as, for example, an event-driven architecture made up of event producers and event consumers in a loosely coupled choreography. The event producer may detect or sense an event such as, for example, a significant occurrence or change in state for system hardware or software and represent the event as a message. The event message may then be transmitted to the event consumer via event channels for processing.

In another exemplary embodiment, the event-driven architecture may include a distributed data streaming platform such as, for example, an APACHE KAFKA platform for the publishing, subscribing, storing, and processing of event streams in real time. As will be appreciated by a person of ordinary skill in the art, each microservice in a microservice choreography may perform corresponding actions independently and may not require any external instructions.

In another exemplary embodiment, microservices may relate to a software development architecture such as, for example, a service-oriented architecture which arranges a complex application as a collection of coupled modular services. The modular services may include small, independently versioned, and scalable customer-focused services with specific business goals. The services may communicate with other services over standard protocols with well-defined interfaces. In another exemplary embodiment, the microservices may utilize technology-agnostic communication protocols such as, for example, a Hypertext Transfer Protocol (HTTP) to communicate over a network and may be implemented by using different programming languages, databases, hardware environments, and software environments.

In another exemplary embodiment, the corresponding attributes may include information that relates to at least one from among a programming language version, a platform type, an application type, a number of code lines, an amount of test coverage, an update history, and a result of previous execution. The attributes may correspond to a piece of information that determines the properties of the corresponding entities. For example, an attribute that correspond to an application may include information that relates to a programming language version of the application.

At step S406, a relationship may be established for each of the entities by using the data set. The relationship may correspond to an interaction between each of the entities. In an exemplary embodiment, the relationship between entities may be inferred based on documented interactions. For example, a relationship between a script and a test may be inferred based on previous execution of the test for the script. In another exemplary embodiment, the relationship between entities may be extracted from documented associations. For example, a relationship between an execution script and an application may be identified from data in the application indicating that the execution script is associated with the application and required for execution of the application.

In another exemplary embodiment, the relationship between the entities may be represented by a visual representation of the codebase. The visual representation may be generated by using the entity information, the corresponding attribute information, and the relationship information. The visual representation may be viewable via a graphical user interface to present a high-level overview of the codebase. In another exemplary embodiment, the entity information, the corresponding attribute information, and the relationship information may be usable to model behaviors of a codebase. The resulting model may correspond to an abstracted representation of the codebase that organizes data elements and standardizes interactions between the data elements.

At step S408, a potential owner for each of the entities may be determined based on a corresponding change history. In an exemplary embodiment, the potential owner may relate to a responsible party such as, for example, a developer, a developer team, and a developer group who are associated with the corresponding entity. For example, the potential owner of a pricing application may correspond to a developer who is responsible for the pricing application.

In another exemplary embodiment, the potential owner of an entity may be inferred from interactions between a party, such as, for example, a developer and the entity. For example, a developer who has frequently interacted with the entity may be inferred to be a potential owner of the entity. In another exemplary embodiment, the potential owner of an entity may be identified from governing documentation such as, for example, a directory. For example, information extracted from a directory may indicate that a particular developer has been listed as the responsible party for a particular application.

In another exemplary embodiment, the change history may correspond to a record of changes that have been made for an entity. The change history may include a log of changes such as, for example, an updating of source codes for the entity. Consistent with disclosures in the present application, potential ownership of an entity by a responsible party may be determined based on interactions between the responsible party and the entity based on analysis of the change history.

At step S410, ownership rules for each of the entities may be defined by using the data set. The ownership rules may associate the potential owner to the corresponding entities. In an exemplary embodiment, the ownership rules may define a responsibility of the potential owner. For example, the ownership rules may indicate that a particular developer is responsible for fixing bugs detected in an entity. In another exemplary embodiment, the ownership rules may define a hierarchy of responsible parties associated with an entity. For example, the ownership rules may indicate that the entity is to be managed by a particular developer who is a part of a particular development group.

At step S412, an actionable item may be computed for each of the entities based on the corresponding attribute. In an exemplary embodiment, the actionable item may correspond to an action necessary to bring an entity to a desired state. For example, the actionable item may include reducing the size of scripts with too many lines of codes. In another exemplary embodiment, the actionable item may correspond to an action necessary for an entity to satisfy a condition. For example, the actionable item may include adding additional tests to scripts with low test coverage.

In another exemplary embodiment, corresponding information may be compiled for each of the potential owners. The corresponding information may include at least one from among actionable item information, entity information, entity metrics information, and entity statistics information. Then, the compiled corresponding information may be exposed via an application programming interface for each of the potential owners. In another exemplary embodiment, a graphical element that includes the compiled corresponding information may be generated. The graphical element may correspond to a graphical representation such as, for example, a dashboard that is displayable via a graphical user interface.

In another exemplary embodiment, computing the actionable item may include identifying a predetermined guideline for each of the entities. The predetermined guideline may include at least one from among an application execution criterion, a test coverage threshold percentage, and a test failure rate. In another exemplary embodiment, the actionable item may be computed for each of the entities by using a predictive model. The predictive model may be used to compute the actionable item based on the corresponding attribute, the corresponding relationship, and the corresponding predetermined guideline.

In another exemplary embodiment, the predictive model may include at least one from among a machine learning model, a statistical model, a mathematical model, a process model, and a data model. The predictive model may also include stochastic models such as, for example, a Markov model that is used to model randomly changing systems. In stochastic models, the future states of a system may be assumed to depend only on the current state of the system.

In another exemplary embodiment, machine learning and pattern recognition may include supervised learning algorithms such as, for example, k-medoids analysis, regression analysis, decision tree analysis, random forest analysis, k-nearest neighbors analysis, logistic regression analysis, etc. In another exemplary embodiment, machine learning analytical techniques may include unsupervised learning algorithms such as, for example, Apriori analysis, K-means clustering analysis, etc. In another exemplary embodiment, machine learning analytical techniques may include reinforcement learning algorithms such as, for example, Markov Decision Process analysis, etc.

In another exemplary embodiment, the predictive model may be based on a machine learning algorithm. The machine learning algorithm may include at least one from among a process and a set of rules to be followed by a computer in calculations and other problem-solving operations such as, for example, a linear regression algorithm, a logistic regression algorithm, a decision tree algorithm, and/or a Naive Bayes algorithm.

In another exemplary embodiment, the predictive model may include training models such as, for example, a machine learning model which is generated to be further trained on additional data. Once the training model has been sufficiently trained, the training model may be deployed onto various connected systems to be utilized. In another exemplary embodiment, the training model may be sufficiently trained when model assessment methods such as, for example, a holdout method, a K-fold-cross-validation method, and a bootstrap method determine that at least one of the training model's least squares error rate, true positive rate, true negative rate, false positive rate, and false negative rates are within predetermined ranges.

In another exemplary embodiment, the training model may be operable, i.e., actively utilized by an organization, while continuing to be trained using new data. In another exemplary embodiment, the models may be generated using at least one from among an artificial neural network technique, a decision tree technique, a support vector machines technique, a Bayesian network technique, and a genetic algorithms technique.

In another exemplary embodiment, a priority designation for each of the actionable items may be determined by using the predictive model. The priority designation may correspond to a characteristic of the actionable item and includes at least one from among a high-value designation, a medium-value designation, and a low-value designation. For example, an actionable item to fix a critical exploit detected in a test may be assigned a high-value designation while an actionable item to resolve minor code inconsistencies may be assigned a low-value designation. Then, the actionable item may be automatically assigned to the potential owner based on the corresponding priority designation and the corresponding ownership rule. For example, the ownership rules may indicate that a high-value designation is escalated to a managing developer while a low-value designation may be assigned to any developer for resolution.

In another exemplary embodiment, a corrective action may be determined for each of the actionable items. The corrective action may be determined by using the predictive model. The corrective action may be automatically determined based on previous actions taken to resolve similar actionable items. Then, the corrective action may be automatically initiated based on a predetermined user preference and the corresponding priority designation to resolve the actionable item. In another exemplary embodiment, the user preference may indicate a desired action for each priority designation. For example, for low-value designations, the user preference may indicate that automated resolution is desired. In another exemplary embodiment, a notification with information relating to the automatically initiated corrective action may be transmitted to a corresponding potential owner.

Figure 5:
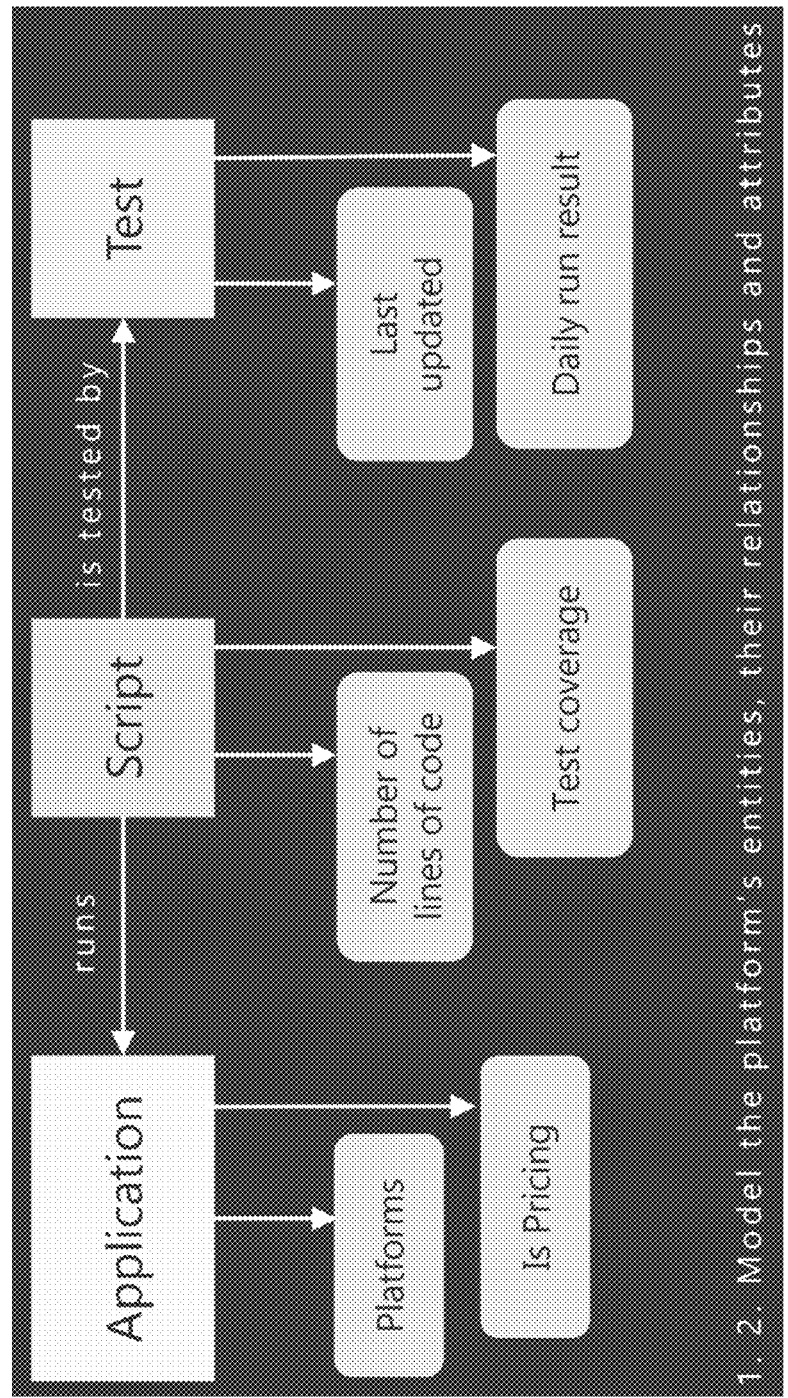
FIG. 5 is a flow diagram of an exemplary modeling process for implementing a method for automatically modeling a codebase to facilitate management and analytics of the codebase at scale.

FIG. 5 is a flow diagram 500 of an exemplary modeling process for implementing a method for automatically modeling a codebase to facilitate management and analytics of the codebase at scale. As illustrated in FIG. 5, entities of a codebase may be presented with corresponding relationships and corresponding attributes. Consistent with present disclosures, the entities may include an application, a script, and a test. The application may have corresponding attributes such as, for example, a platform type and an application type. The script may have corresponding attributes such as, for example, a number of lines of code and test coverage percentage. The test may have corresponding attributes such as, for example, last updated information and daily run results. Additionally, relationships between the entities may indicate that the script runs the application, and the test is used on the script.

Figure 6:
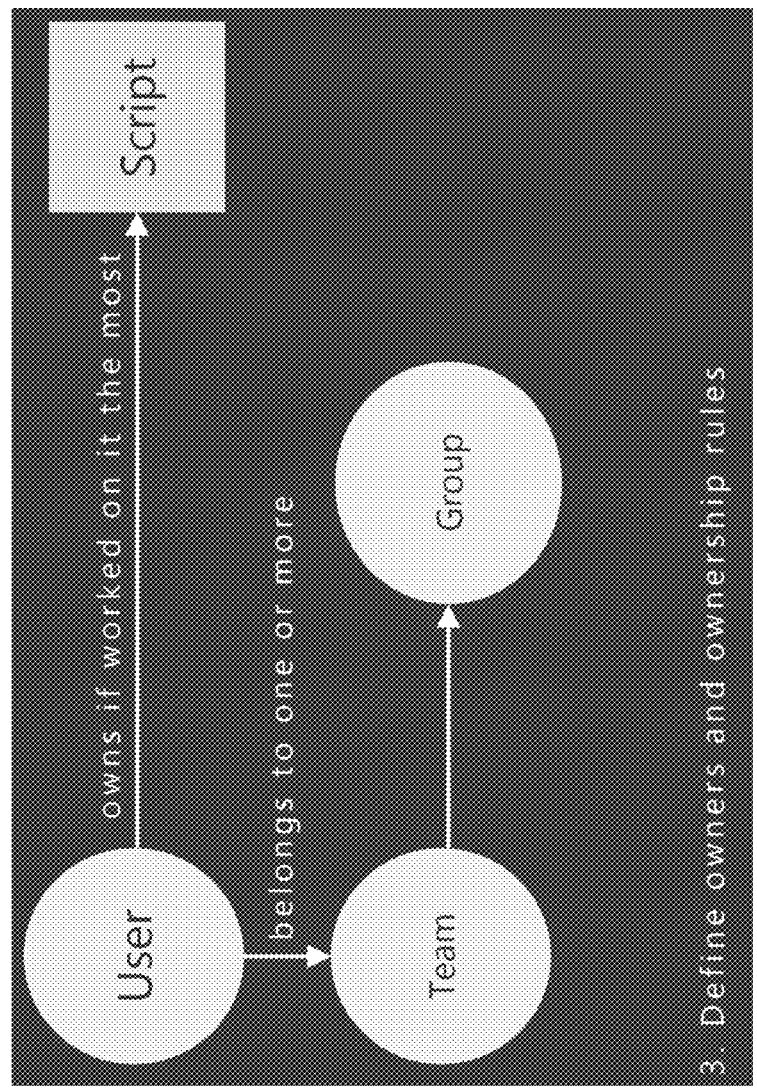
FIG. 6 is a flow diagram of an exemplary ownership defining process for implementing a method for automatically modeling a codebase to facilitate management and analytics of the codebase at scale.

FIG. 6 is a flow diagram 600 of an exemplary ownership defining process for implementing a method for automatically modeling a codebase to facilitate management and analytics of the codebase at scale. As illustrated in FIG. 6, a user may be identified as a potential owner of a script when change history indicates that the user has worked on the script the most. Additional information for the user may also be identified to determine ownership ruled. The additional information may include a team and/or a group that the user belongs to. The additional information for the user may be identified based on a shared characteristic of the user such as, for example, a work group identifier.

Figure 7:
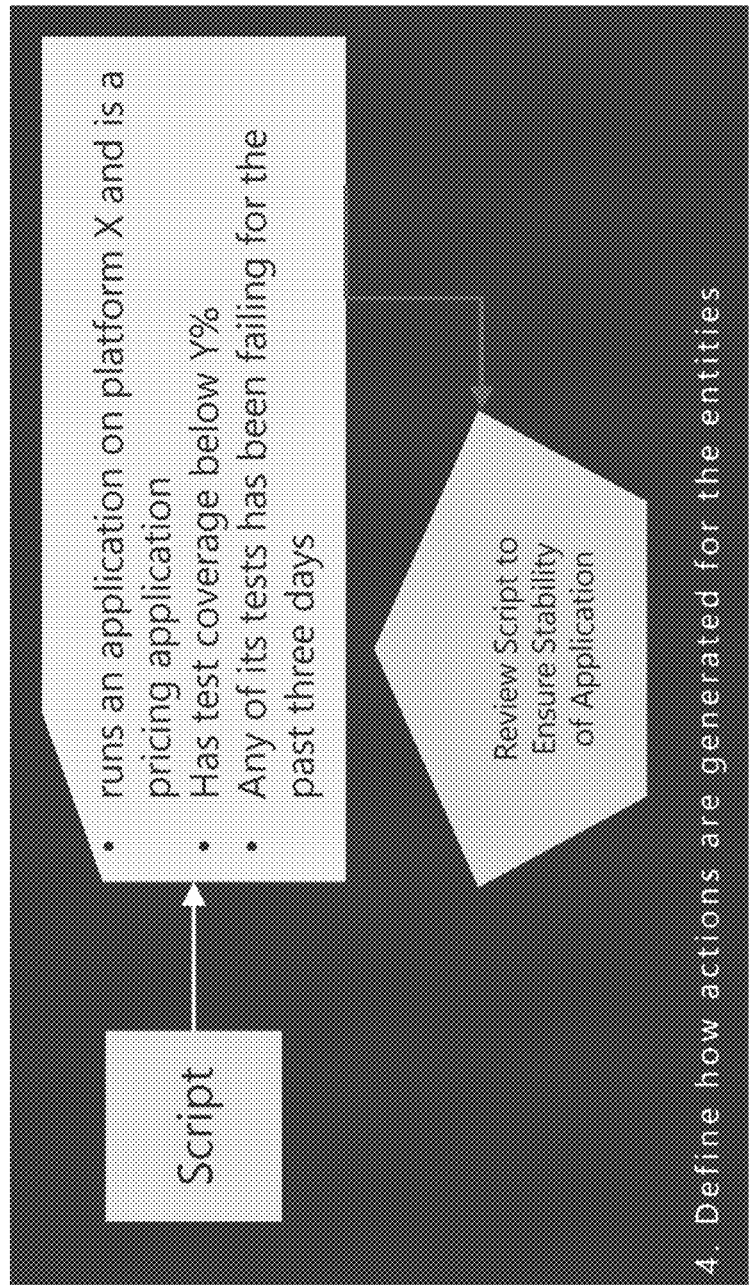
FIG. 7 is a flow diagram of an exemplary actionable item defining process for implementing a method for automatically modeling a codebase to facilitate management and analytics of the codebase at scale.

FIG. 7 is a flow diagram 700 of an exemplary actionable item defining process for implementing a method for automatically modeling a codebase to facilitate management and analytics of the codebase at scale. In FIG. 7, actionable items may be generated for the entities. As illustrated in FIG. 7, criteria such as, for example, a test coverage percentage, a test failure within a time frame, and an application platform may be usable to determine an actionable item for a script. Then, the script may be subsequently reviewed to ensure application stability.

Figure 8:
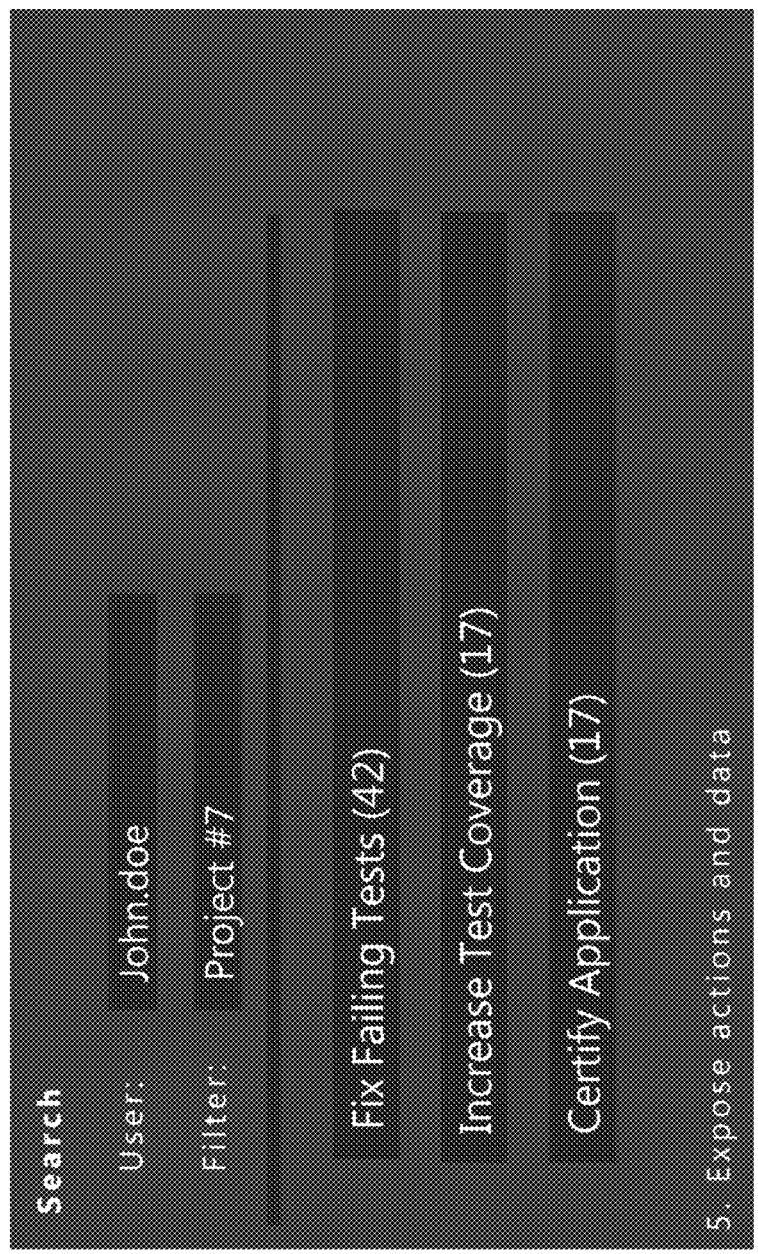
FIG. 8 is a screen shot that illustrates a graphical user interface that is usable for implementing a method for automatically modeling a codebase to facilitate management and analytics of the codebase at scale, according to an exemplary embodiment.

FIG. 8 is a screen shot 800 that illustrates a graphical user interface that is usable for implementing a method for automatically modeling a codebase to facilitate management and analytics of the codebase at scale, according to an exemplary embodiment. As illustrated in FIG. 8, the graphical user interface may expose entity information for a potential owner. The graphical user interface may provide entity information such as, for example, "fix failing tests," "increase test coverage," and "certify application" that are associated with the potential owner.

Accordingly, with this technology, an optimized process for automatically modeling a codebase to facilitate management and analytics of the codebase at scale is disclosed.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for automatically modeling a codebase to facilitate management and analytics, the method being implemented by at least one processor, the method comprising:

automatically aggregating, by the at least one processor, at least one data set comprising source code data, the at least one data set corresponding to a codebase;

identifying, by the at least one processor from the at least one data set, a plurality of entities and corresponding attributes, the plurality of entities relating to one or more components included in the codebase, wherein the plurality of entities include at least one script comprising commands that are executed by an application generated by the codebase, at least one test including a test script to test functions of the application, and the at least one application and the corresponding attributes comprise of properties of the at least one script, at least one test, and at least one application;

establishing, by the at least one processor using the at least one data set, at least one relationship for each respective entity of the plurality of entities, the at least one relationship corresponding to an interaction between each respective entity with respect to the one or more components of the codebase;

generating a visual graph indicating the at least one relationship of the plurality of entities with respect to the one or more components of the codebase;

displaying, on a display, the generated visual graph indicating the at least one relationship of the plurality of entities with respect to the one or more components of the codebase;

subsequent to the displaying, determining, by the at least one processor, at least one potential owner for each respective entity of the plurality of entities based on a corresponding change history;

for each of the at least one potential owner, defining, by
the at least one processor using the at least one data set,
at least one ownership rule for each respective entity of
the plurality of entities, the at least one ownership rule
associating the at least one potential owner to the
respective entity; and for each respective entity of the plurality of entities:
automatically computing, by the at least one processor,
at least one actionable item for the respective entity
of the plurality of entities based on the at least one
corresponding attribute, wherein the at least one
actionable item includes reducing a size of the at
least one entity;
automatically assigning, by the at least one processor,
the at least one actionable item to the determined at
least one potential owner of the respective entity;
automatically determining, by the at least one processor
using the at least one predictive model based on at
least a predetermined user preference, at least one
corrective action for the at least one actionable item;
and
automatically executing, by the at least one processor,
the at least one corrective action for automated
resolution of the at least one actionable item without
awaiting instructions from the at least one potential
owner.

2. The method of claim 1, further comprising:
compiling, by the at least one processor for each of the at
least one potential owner, corresponding information
that includes at least one from among actionable item
information, entity information, entity metrics information, and entity statistics information; and
exposing, by the at least one processor via an application
programming interface, the compiled corresponding
information for each of the at least one potential owner.

3. The method of claim 1, wherein computing the at least
one actionable item further comprises:
identifying, by the at least one processor, at least one
predetermined guideline for each of the at least one
entity; and
computing, by the at least one processor using at least one
predictive model, the at least one actionable item for
each respective entity of the plurality of entities based
on the at least one corresponding attribute, the at least
one corresponding relationship, and the at least one
corresponding predetermined guideline.

4. The method of claim 3, wherein the at least one
predetermined guideline includes at least one from among
an application execution criterion, a test coverage threshold
percentage, and a test failure rate.

5. The method of claim 3, wherein the at least one
predictive model includes at least one from among a
machine learning model, a statistical model, a mathematical
model, a process model, and a data model.

6. The method of claim 3, further comprising:
determining, by the at least one processor using the at
least one predictive model, a priority designation for
each of the at least one actionable item,
wherein the at least one actionable item is automatically
assigned to the determined at least one potential owner
based on the corresponding priority designation and the
corresponding at least one ownership rule.

7. The method of claim 6,
wherein the at least one corrective action is automatically
executed based on the predetermined user preference
and the corresponding priority designation.

8. The method of claim 1, wherein the at least one data set
is aggregated based on a predetermined schedule.

9. The method of claim 1, wherein the corresponding
attributes include information that relates to at least one
from among a programming language version, a platform
type, an application type, a number of code lines, an amount
of test coverage, an update history, and a result of previous
execution.

10. A computing device configured to implement an
execution of a method for automatically modeling a codebase to facilitate management and analytics, the computing
device comprising:
a processor;
a display;
a memory; and
a communication interface coupled to each of the processor and the memory, wherein the processor is configured to:
automatically aggregate at least one data set, comprising
source code data, the at least one data set corresponding
to a codebase;
identify, from the at least one data set, a plurality of
entities and corresponding attributes, the plurality of
entities relating to one or more components included in
the codebase, wherein the plurality of entities include at
least one script comprising commands that are executed
by an application generated by the codebase, at least
one test including a test script to test functions of the
application, and the at least one application and the
corresponding attributed comprise of properties of the
at least one script, at least one test, and at least one
application;
establish, by using the at least one data set, at least one
relationship for each respective entity of the plurality of
entities, the at least one relationship corresponding to
an interaction between each respective entity with
respect to one or more components of the codebase;
generate a visual graph indicating the at least one relationship of the plurality of entities with respect to the
one or more components of the codebase;
display, on the display, the generated visual graph indicating the at least one relationship of the plurality of
entities with respect to the one or more components of
the codebase;
subsequent to the displaying, determine at least one
potential owner for each respective entity of the plurality of entities based on a corresponding change
history;
for each of the at least one potential owner, define, by
using the at least one data set, at least one ownership
rule for each respective entity of the plurality of entities, the at least one ownership rule associating the at
least one potential owner to the respective entity; and
for each respective entity of the plurality of entities:
automatically computing, at least one actionable item
for the respective entity of the plurality of entities
based on the at least one corresponding attribute,
wherein the at least one actionable item includes
reducing a size of the at least one entity;
automatically assign the at least one actionable item to
the determined at least one potential owner of the
respective entity;
automatically determine, using the at least one predictive model based on at least a predetermined user
preference, at least one corrective action for the at
least one actionable item; and automatically executing the at least one corrective action for automated resolution of the at least one actionable item without awaiting instructions from the at least one potential owner.

11. The computing device of claim 10, wherein the processor is further configured to: compile, for each of the at least one potential owner, corresponding information that includes at least one from among actionable item information, entity information, entity metrics information, and entity statistics information; and expose, via an application programming interface, the compiled corresponding information for each of the at least one potential owner.

12. The computing device of claim 10, wherein, to compute the at least one actionable item, the processor is further configured to:
identify at least one predetermined guideline for each respective entity of the plurality of entities; and
compute, by using at least one predictive model, the at least one actionable item for each respective entity of the plurality of entities based on the at least one corresponding attribute, the at least one corresponding relationship, and the at least one corresponding predetermined guideline.

13. The computing device of claim 12, wherein the at least one predetermined guideline includes at least one from among an application execution criterion, a test coverage threshold percentage, and a test failure rate.

14. The computing device of claim 12, wherein the at least one predictive model includes at least one from among a machine learning model, a statistical model, a mathematical model, a process model, and a data model.

15. The computing device of claim 12, wherein the processor is further configured to:
determine, by using the at least one predictive model, a priority designation for each of the at least one actionable item; and
wherein the at least one actionable item is automatically assigned to the determined at least one potential owner based on the corresponding priority designation and the corresponding at least one ownership rule.

16. The computing device of claim 15,
wherein the at least one corrective action is automatically executed based on the predetermined user preference and the corresponding priority designation.

17. The computing device of claim 10, wherein the processor is further configured to aggregate the at least one data set based on a predetermined schedule.

18. The computing device of claim 10, wherein the corresponding at least one attribute includes information that relates to at least one from among a programming language version, a platform type, an application type, a number of code lines, an amount of test coverage, an update history, and a result of previous execution.

19. A non-transitory computer readable storage medium storing instructions for automatically modeling a codebase to facilitate management and analytics, the storage medium comprising executable code which, when executed by a processor, causes the processor to:
automatically aggregate at least one data set comprising source code data, the at least one data set corresponding to a codebase;
identify, from the at least one data set, a plurality of entities and at corresponding attributes, the plurality of entities relating to one or more components included in codebase, wherein the plurality of entities include at least one script comprising commands that are executed by an application generated by the codebase, at least one test including a test script to test functions of the application, and the at least one application and the corresponding attributed comprise of properties of the at least one script, at least one test, and at least one application;
establish, by using the at least one data set, at least one relationship for each respective entity of the plurality of entities, the at least one relationship corresponding to an interaction between each respective entity with respect to one or more components of the codebase;
generate a visual graph indicating the at least one relationship of the plurality of entities with respect to the one or more components of the codebase;
display, on a display, the generated visual graph indicating the at least one relationship of the plurality of entities with respect to the one or more components of the codebase;
subsequent to the displaying, determine at least one potential owner for each respective entity of the plurality of entities based on a corresponding change history;
for each of the at least one potential owner, define, by using the at least one data set, at least one ownership rule for each respective entity of the plurality of entities, the at least one ownership rule associating the at least one potential owner to the respective entity; and
for each respective entity of the plurality of entities:
automatically compute, at least one actionable item for the respective entity of the plurality of entities based on the at least one corresponding attribute, wherein the at least one actionable item includes reducing a size of the at least one entity;
automatically assign the at least one actionable item to the determined at least one potential owner of the respective entity;
automatically determine, using the at least one predictive model based on at least a predetermine user preference, at least one corrective action for the at least one actionable item; and
automatically executing the at least one corrective action for automated resolution of the at least one actionable item without awaiting instructions from the at least one potential owner.

20. The storage medium of claim 19, wherein the executable code further causes the processor to:
compile, for each of the at least one potential owner, corresponding information that includes at least one from among actionable item information, entity information, entity metrics information, and entity statistics information; and
expose, via an application programming interface, the compiled corresponding information for each of the at least one potential owner.

* * * * *